United States Patent
Dudley

[11] 3,908,776
[45] Sept. 30, 1975

[54] MOTORIZED WHEEL
[75] Inventor: Albert Edward Frederick Dudley, Aylesbury, England
[73] Assignee: Saunders & Dudley Limited, Aylesbury, England
[22] Filed: May 22, 1973
[21] Appl. No.: 362,760

[52] U.S. Cl. ............................................. 180/65 F
[51] Int. Cl.² ........................................... B60K 7/00
[58] Field of Search ....... 180/6.5, 65 F, 65 R, 66 R, 180/74, 44 E

[56] References Cited
UNITED STATES PATENTS

| | | | |
|---|---|---|---|
| 1,172,456 | 2/1916 | Hoadley | 180/65 F |
| 3,265,147 | 8/1966 | Coordes | 180/66 F |
| 3,532,177 | 10/1970 | Herrman | 180/66 R |
| 3,613,813 | 10/1971 | Biddle | 180/65 F |
| 3,730,287 | 5/1973 | Fletcher | 180/6.5 |

Primary Examiner—David Schonberg
Assistant Examiner—John A. Pekar
Attorney, Agent, or Firm—Waters, Schwartz & Nissen

[57] ABSTRACT

A wheelchair has each of its rear wheels motorized. The hub of each wheel contains an electric motor and a pinion driven thereby and these are carried on a swingable plate pivotally mounted on a fixed plate attached to the body of the wheelchair. Each hub has fixed thereto co-axially an internally toothed annulus. Provided at each wheel is a manual lever attached to an eccentric and turnable to cause the eccentric to turn the swingable plate and thereby to bring the pinion into and out of driving engagement with the annulus.

3 Claims, 5 Drawing Figures

MOTORIZED WHEEL

BACKGROUND OF THE INVENTION

1. Field of the Invention

This invention relates to a motorized wheel, particularly for a wheelchair.

2. Description of the Prior Art

Wheelchairs propelled by electric motors supplied from batteries carried by the wheelchairs are well known.

One such known kind of wheelchair has its rear wheels driven by respective individually controlled, electric motors via respective transmissions each consisting of pulleys and a belt. The belts can be individually tightened and untightened by levers disposed at respective opposite sides of the wheelchair. With the belts in a tightened condition, the motors can drive the rear wheels via the belts. With the belts in an untightened condition, an attendant or the patient can propel the wheelchair without having to overcome the friction in the transmissions. However, this arrangement has a number of disadvantages. In particular, the belts when untightened still tend to apply friction forces at the pulleys, particularly if the transmission has been badly adjusted. Additionally, there is a risk of the patient's clothing and other articles being caught up between the belts and the pulleys.

SUMMARY OF THE INVENTION

According to the present invention, there is provided a motorized wheel comprising a rotary wheel body, a motor unit for driving said body, transmission means arranged to interconnect said motor unit and said body and including first and second transmission members which are respectively connected to said unit and said body and which are engageable with and disengageable from each other to connect said unit with said body and disconnect said unit from said body, and means mounting said unit and the first transmission member so that said unit and said first transmission member are together displaceable to bring said first transmission member into and out of engagement with the second transmission member.

The invention has the advantage that in a wheelchair whereof each of the rear wheels is such a motorized wheel, the first transmission members can be reliably brought out of engagement with the second transmission members, so that an attendant or the patient can propel the wheelchair virtually as though it were not self-propelled. Another advantage is that the transmission members can be arranged so that there is no risk of the patient's clothing or other articles becoming caught up in the transmissions.

BRIEF DESCRIPTION OF THE DRAWINGS

In order that the invention may be clearly understood and readily carried into effect, reference will now be made, by way of example, to the accompanying drawings, in which.

DESCRIPTION OF THE PREFERRED EMBODIMENTS

Figure 1:
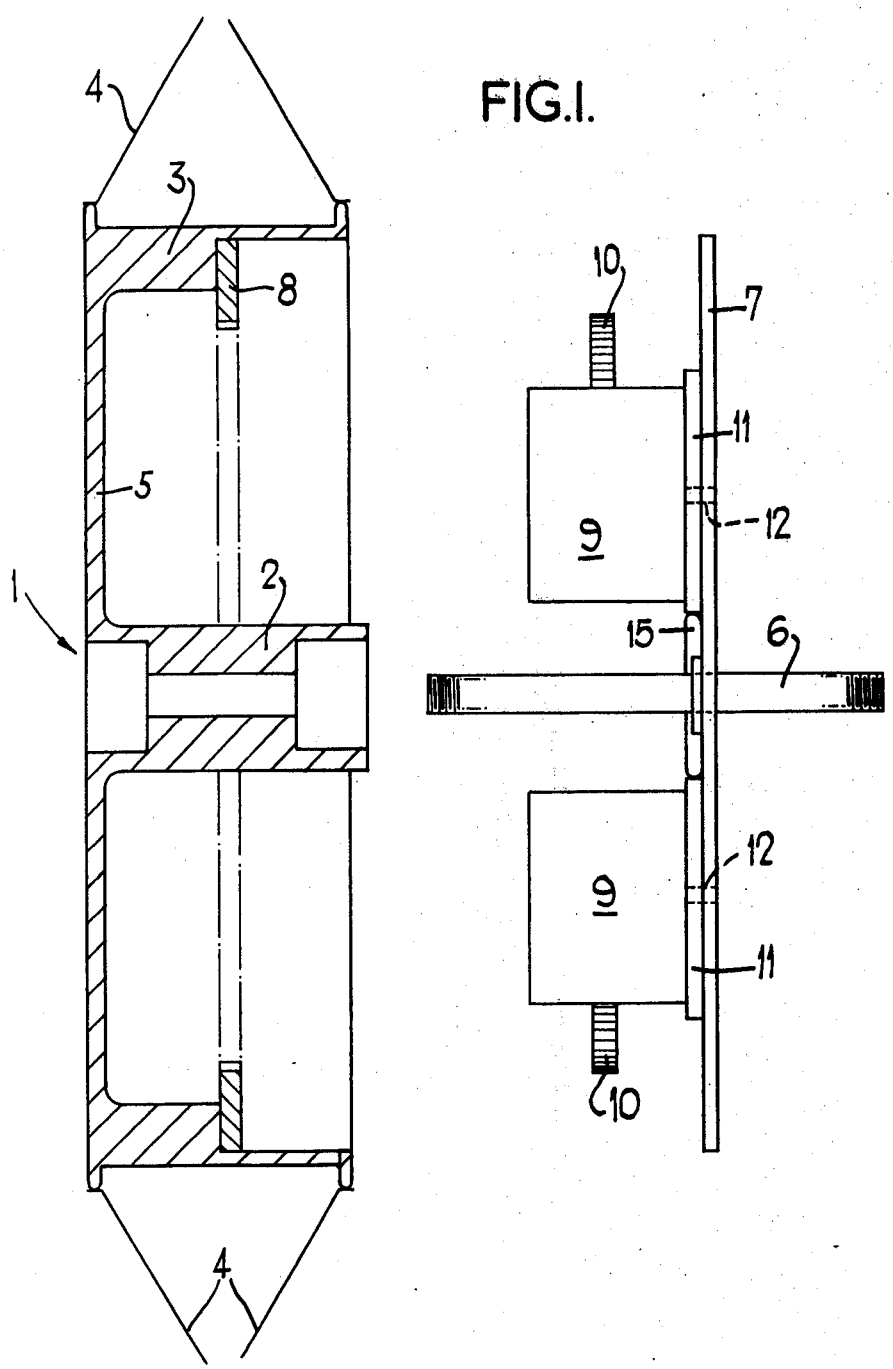
FIG. 1 is an exploded axial sectional view of a motorized wheel of a wheelchair.
Figure 2:
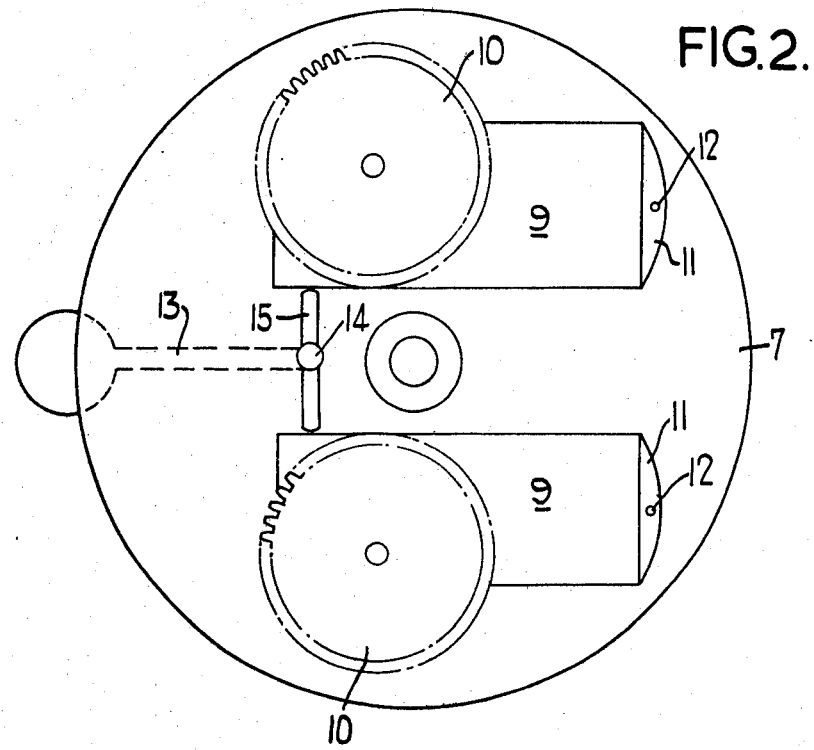
FIG. 2 is an end elevation of an inside end plate of the wheel.
Figure 5:
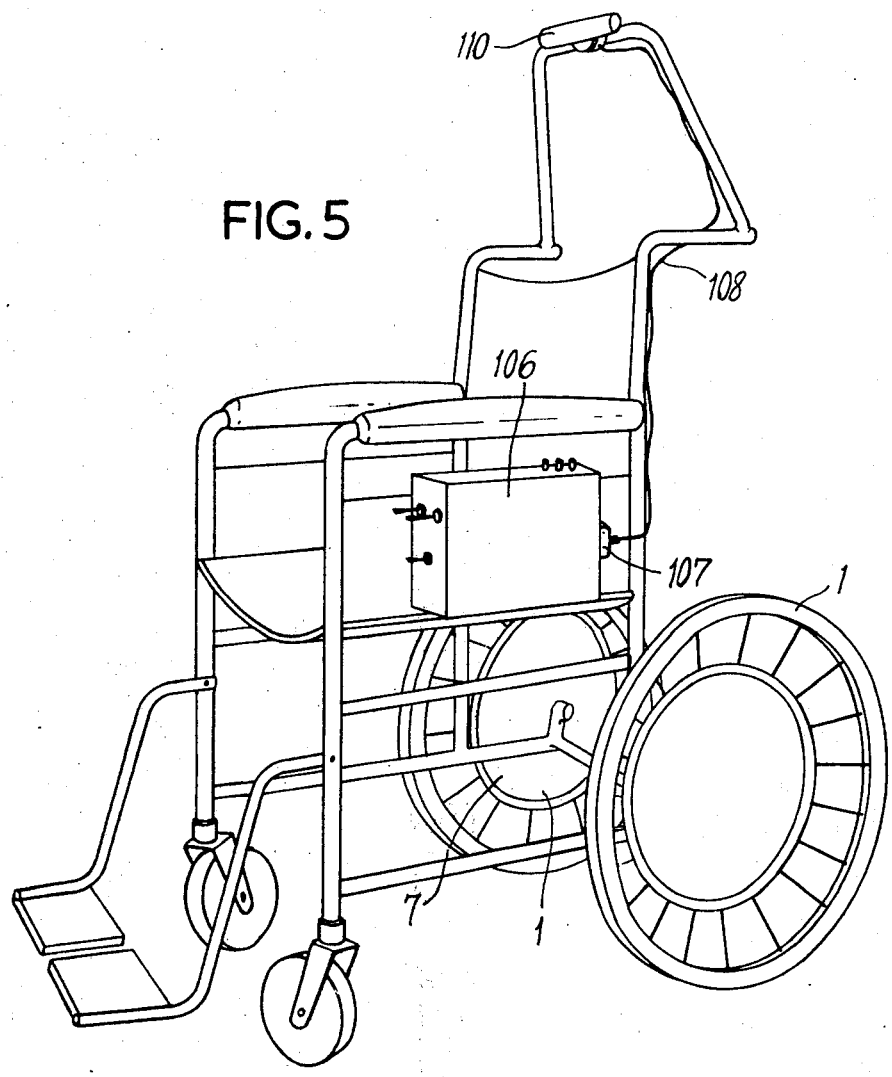
FIG. 5 shows a diagrammatic perspective view of the wheelchair fitted with rear wheels each as shown in FIGS. 1 and 2.

Referring to FIGS. 1, 2, and 5 the wheelchair has at its left-and right-hand sides respective identical motorized rear ground wheels which are rotatable independently of each other. Each of these wheels includes a rotary wheel body having a hub 1. From FIG. 1, it will be seen that the hub 1 consists of an inner ring 2, an outer ring 3 to which are attached spokes 4, and a radial flange 5 interconnecting the rings 2 and 3. The hub 1 is rotatably mounted on an axle 6 which is fixed to a frame (not shown) of the wheelchair. The hollow hub 1 is closed at its axially inner end by the circular plate 7 fixed to the axle 6. Fixed to the ring 3 in the hollow interior of the hub 1 is a driven ring in the form of an internally toothed, annular plate 8 which is co-axial with the hub 1. Wholly disposed in the interior of the hub 1 and to respective opposite sides of the axis of rotation of the wheel body are two electric motor units 9 and two driving gearwheels 10 which are rotated by the respective units 9 and are engageable with the annular plate 8 to drive the same. The units 9 and the gearwheels 10 are mounted on respective plates 11 which are supported by the plate 7 by way of respective pivot pins 12 so as to be swingable towards and away from the annular plate 8. The plate 7 also carries relays controlling the motors 9, sockets for plugs connected to electrical supply and control leads, and acceleration limiters for the drive. Springs (not shown) urge the plates 11, and thus the gearwheels 10, towards the axle 6 and therefore press the gearwheels 10 out of engagement with the annular plate 8. To bring the gearwheels 10 into engagement with the plate 8 in opposition to the springs, there is provided a control arm 13 which is fixed to a pivot pin 14 mounted in the plate 7 and this pin 14 is fixed to a crosspiece 15 which, in the position shown, holds the gearwheels in engagement with the annular plate. However, on turning of the arm 13 and thus the crosspiece 15, about the axis of the pin 14 through a right-angle from the position shown, the springs displace the plates 11 away from the annular plate 8 and thus disengage the gearwheels from the annular plate 8.

It will be appreciated that the other rear wheel of the wheelchair is identical to that shown in FIGS. 1 and 2.

Should a patient in the wheelchair desire to drive the hub shown, the control arm 13 is manually or otherwise operated by the patient to engage the gearwheels 10 with the plate 8.

In a modified version not illustrated, the ring 8 takes the form of a chain fixed in an annular slot in the ring 3, the gearwheels 10 being arranged to engage with transverse pins interconnecting the links of the chain.

An advantage of the motorized wheel described is that the drive transmission (8, 10) is disposed within the hub 1 and is thus protected against damage, while at the same time the patient is protected against having part of his body or clothing caught up in the transmission. Another advantage is that the arrangement can be fitted simply and cheaply to a manually driven wheelchair with little adaptation of the wheelchair being required. For example, it is chiefly necessary simply to remove each of the rear ground wheels and replace it by a motorized wheel as shown.

Figure 4:
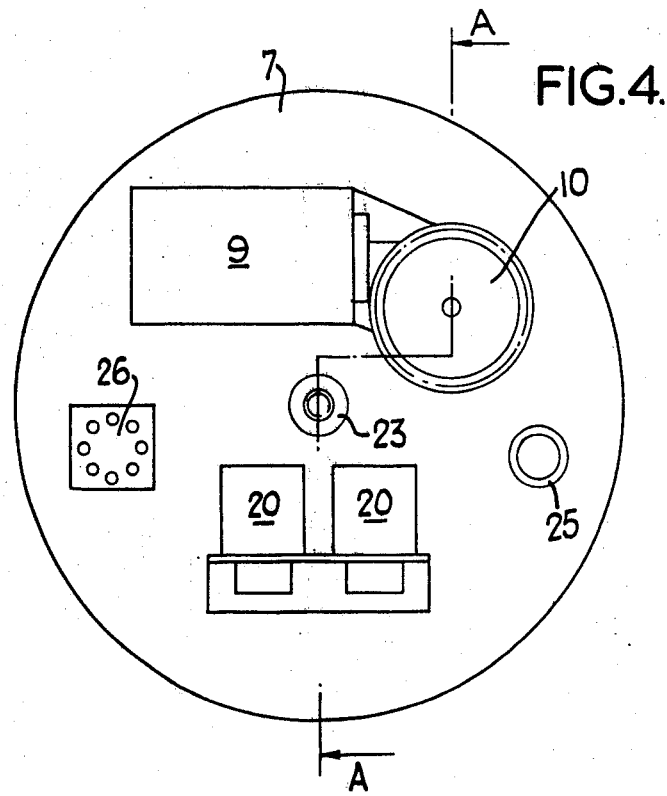
FIG. 4 is an end elevation of an inside end plate of the modified version.
Figure 3:
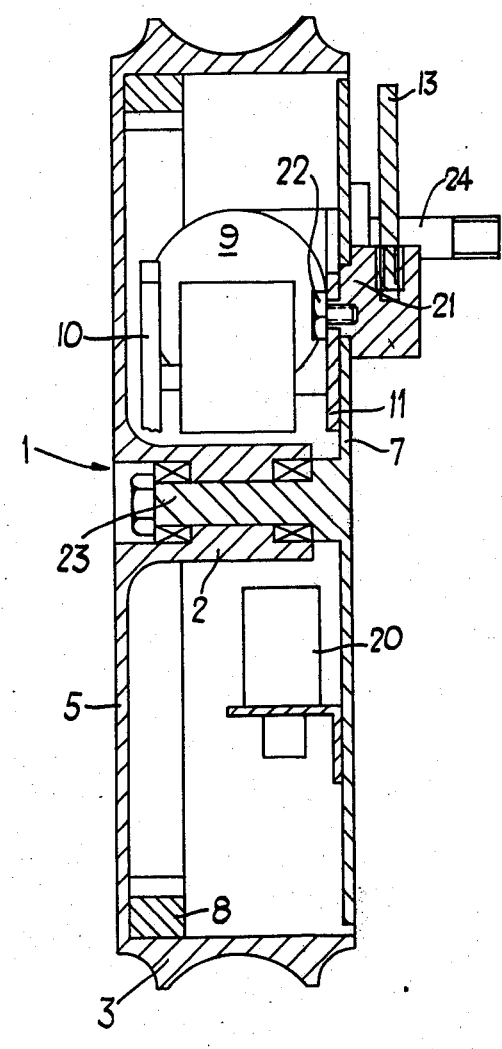
FIG. 3 is an axial sectional view of a modified version of the wheel.

FIG. 3 is a section taken on the lines A-A' of FIG. 4. The version of FIGS. 3 and 4 differs from that of FIGS. 1 and 2 in certain respects. Firstly, only one drive device 9 and 10 is provided, the space made free by the omission of the second device being occupied by the electrical relays 20. Secondly, the device for bringing the gearwheel 10 into and out of engagement with the annulus 8 consists of an eccentric 21 which is mounted in a horizontal bore through the plate 7 so as to be turnable about a horizontal axis by the lever 13, the plate 11 being bolted at 22 to the eccentric 21. Moreover, the plate 7 has fixed thereto an axle 23 on which is rotatably mounted the wheel body 2, 3, 5, the tyre (not shown) being fitted directly onto the outer periphery of the body 2, 3, 5. The plate 7 is fixed to the wheelchair body by way of a stub shaft 24 which is fitted into an existing axle hole in the body of the wheelchair. The shaft 24 has been firmly fixed to the plate 7 at a height selected according to the height of the existing axle hole from the ground. Also seen in FIG. 4 are a socket 25 for a control plug and a socket 26 for a power supply plug.

Referring to FIG. 5, the motor units are controlled by movements of a headrest 110 by the patient, such movements producing signals which are transmitted via leads 108, a plug 107 and a control box 106, to the motor units in the hubs 1. A battery tray and the batteries carried thereby have been omitted from the Figure.

I claim:

1. In an invalid carriage, a combination comprising frame means, a rotary wheel body mounted on said frame means and supporting a ground-engaging tire, an annular web extending from the outer peripheral region to the inner peripheral region of said wheel body, a bush-form hub integral with said web, a stub shaft fixed to said frame means and rotatably mounting said wheel body on said frame means, a motor for driving said body, drive transmission means arranged to interconnect said motor and said body and including a driving pinion and a driven gear respectively connected to said motor and said body, said pinion and gear being engageable with and disengageable from each other to connect said motor with said body and disconnect said motor from said body, said rotary wheel body fixedly mounting said driven gear, and means mounting said motor and said driving pinion as a unit on said frame means for relative movement between a first position in which said driving pinion and said driven gear are interengaged for driving said wheel body on operation of said motor and a second position in which said driving pinion is disengaged to permit free rotation of said wheel body, said driven gear being disposed inwards from said ground-engaging tire.

2. In an invalid carriage, a combination comprising frame means, a rotary wheel body mounted on said frame means and supporting a ground-engaging tire, a motor for driving said body, drive transmission means arranged to interconnect said motor and said body and including a driving pinion and a driven gear respectively connected to said motor and said body and engageable with and disengageable from each other to connect said motor with said body and disconnect said motor from said body, said rotary wheel body fixedly mounting said driven gear, means mounting said motor and said driving pinion as a unit on said frame means for relative movement between a first position in which said driving pinion and said driven gear are interengaged for driving said wheel body on operation of said motor and a second position in which said driving pinion is disengaged to permit free rotation of said wheel body, and a rotary cam acting between said unit and said frame means and turnable relative to said unit and said frame means to produce said relative movement, said driven gear being disposed inwards from said ground-engaging tire.

3. A combination according to claim 2, and further comprising a manual operating handle fixed to said rotary cam for turning said cam to produce said relative movement.

* * * * *